United States Patent [19]

Grosmann et al.

[11] Patent Number: 5,359,403
[45] Date of Patent: Oct. 25, 1994

[54] TELEMETRY DEVICE AND APPLICATION THEREOF TO A SYSTEM FOR THE DETECTION OF OBSTACLES

[75] Inventors: Benoist Grosmann, Issy Les Moulineaux; Martin Defour, Croissy S/Seine; Rémi Fertala, St Cyr L'Ecole, all of France

[73] Assignee: Thomson-CSF, Puteaux, France

[21] Appl. No.: 37,595

[22] Filed: Mar. 26, 1993

[30] Foreign Application Priority Data

Mar. 27, 1992 [FR] France ................... 9203716

[51] Int. Cl.⁵ .................... G01C 3/08; G01B 11/26; G08B 21/00; G02B 26/08
[52] U.S. Cl. ............................ 356/5; 340/946; 356/141.1; 359/201; 359/211
[58] Field of Search .............. 356/5, 141; 340/946, 340/961, 963; 359/201, 211

[56] References Cited

U.S. PATENT DOCUMENTS 4,068,124  1/1978  Kleider .
4,572,662  2/1986  Silverman .
4,698,498  10/1987 Mahoney et al. .
4,902,126  2/1990  Koechner .................. 356/5
4,916,445  4/1990  Crossley .................. 340/946
5,210,586  5/1993  Grage et al. ............... 356/5

FOREIGN PATENT DOCUMENTS

2258637  8/1975  France .

Primary Examiner—Stephen C. Buczinski
Attorney, Agent, or Firm—Oblon, Spivak, McClelland, Maier & Neustadt

[57] ABSTRACT

A telemeter is used to measure the distances between a sequence of points on a target surface. The telemeter includes an emitting source provided with a pulsed laser sending out a pencil of light energy in a determined direction of sight, a contra-rotating wedge communicating, to the pencil, a deflection along an epicycloidal type of scanning pattern in a plane perpendicular to the axis of sight, and a receiver including the same contra-rotating wedge and a photodiode. The disclosed device can be applied more particularly to a system for the detection of obstacles of a wire-shaped type.

13 Claims, 5 Drawing Sheets

TELEMETRY DEVICE AND APPLICATION THEREOF TO A SYSTEM FOR THE DETECTION OF OBSTACLES

BACKGROUND OF THE INVENTION

1. Field of the Invention

The invention relates to a telemetry device and can be applied especially to a system for the detection of obstacles, especially obstacles constituted by wire-shaped objects such as high-voltage cables. It relates notably to obstacle detection systems for helicopters.

The presence of cables or wire-shaped objects makes the piloting of helicopters at low altitudes a very vulnerable operation. This is especially true at night when the standard means of vision, of the infrared camera or light intensifier type, cannot be used to detect such targets.

2. Description of the Prior Art

Many approaches have been proposed to resolve the problem of the detection of such obstacles. Some of these approaches may be cited by way of non-restrictive examples.

The article by P. Condom, *Evitement d'obstacles pour helicopteres: une solution en ondes millimetriques* (Obstacle Avoidance For Helicopters: A Solution Using Millimetric Waves) in Interavia 5, 1985, pp. 459–460, describes a millimetric wave radar.

This system has the drawback of showing reduced sensitivity when the angle of incidence between the cable and the line of sight is great. This limitation must be considered in direct relation to the range of the wavelength used. For millimetric wavelengths, it is the specular reflection that is preponderant. This means that there are no lateral scattering cones.

Measurements of laser equivalent surfaces of electrical cables at the wavelengths of the infrared range have shown that this range of wavelengths is well suited to the detection of cables. Indeed, the scattered reflection makes it possible to obtain echos at the high values of incidence.

A $CO_2$ laser emitting at the 10.6 $\mu$m wavelength can be used as an active source. The LOTAWS project may be cited here. The detection of cables is done at this wavelength. This project is described in a U.S. Army report entitled: "Laser Obstacle Terrain Avoidance Warning System", R&D technical report ECOM-0145.3, ECOM-72-0145.4, ECOM-0145.2, U.S. Army Electronics Command, Fort Monmouth, N.J., 1972–1973. However, problems related to the amount of space occupied considerably restrict the use of a laser source such as this on board a helicopter.

Devices based on a television type scanning system have also been proposed. A first device of this type is described in the article by M. Eibert: "Laser Radar Based Obstacle Avoidance System For Helicopters", ERF91-20, pp. 185–193. This device uses laser diodes emitting at 0.8 $\mu$m.

The scanning of the line of sight is obtained mechanically and electronically with television type scanning pattern. The electronic scanning is obtained in one direction by the use of an array of diode lasers that emit sequentially. Similarly, at reception, an array of detectors is used, working in phase with the array of laser diodes. The scanning in the other direction is obtained mechanically by means of an oscillating mirror. This device has the drawback of using multiplexing techniques to place the emitting diode and the corresponding detector temporally in phase. Furthermore, the mechanical scanning, namely the oscillating mirror, introduces accumulations of dots at the ends.

A second device of this type is obtained in a sales brochure of the firm Northrop. This system is called OASYS (Obstacle Avoidance System) and is described in the article by B. Nordwall, "Army Seeks To Detect Wires, So Helicopter Pilots Can Fly Fast, Low"; *Aviation Week & Space Technology*, Jan. 22, 1990, pp. 77 to 81.

The device uses a laser diode emitting on a wavelength of 0.9 $\mu$m. The scanning of the line of sight is obtained with a holographic scanning. The pattern described is also a television type scanning pattern. This system implies the use of a hologram having a diameter that is twice that of the reception pupil. Only the equivalent of 25% of the power, therefore, is recovered at the reception pupil.

Passive detection systems may also be cited. In this case, the cable is detected by means of the magnetic field created by the current. The detection is therefore possible only when the electrical cables are under voltage, and this considerably limits the field of use. A method such as this is described in the article by K. E. Potter et al., "Technique For Overhead Wire Detection", IEEE Proc., Vol. 128, No. 7, December, 1981, pp. 427–432.

SUMMARY OF THE INVENTION

The invention seeks to overcome the drawbacks of prior art devices that have just been recalled.

To do this, the device of the invention uses a pulsed laser diode, for example a diode emitting in the infrared range at 0.9 $\mu$m, in association with a scanning system using a contra-rotating wedge (described in greater detail here below). The signal back-scattered by the cable or, more generally, by the obstacles is then detected. A telemetrical measurement is performed. This measurement is given by the time taken by the laser pulse to make the return journey. In order to keep only those echos that correspond to the cables to be detected, a method for the extraction of overhead objects is resorted to. Shape-recognition methods are then used to extract the desired obstacles, for example the cables. The echos are then "overlaid" on the images coming from a CCD type camera or on any appropriate display means.

The scanning pattern obtained with a contra-rotating wedge is especially suited to the detection of obstacles, for the filling rate is greater at the center of the field. The performing of a scanning operation such as this is furthermore very simple and remains compatible with large-sized pupils. This configuration is therefore particularly suited to systems that work with low-power laser sources or when long-range operation is required.

The fact that the contra-rotating wedges take up very little space enables the reception pupil to be optimized, for the dimension of the prisms is substantially equal to the dimension of the reception pupil.

An object of the invention therefore is a telemetry device comprising means for the sending of a pencil of light energy along an axis of sight for the measurement of the distances between these sending means and a target sending back, as an echo, at least a part of the received energy towards the sending means, means for the reception of the energy thus sent and means to determine said distances, wherein said device further comprises at least one contra-rotating wedge provided with two prisms that are moved by rotational speeds in opposite directions about said axis and that communicate a time-variable deflection to the pencil of light energy so that it describes a determined scanning pattern in a plane that is perpendicular to said axis, the pencil that is sent out scanning the target according to the configuration of the scanning pattern.

An object of the invention is also a system for the detection of obstacles using a device such as this.

BRIEF DESCRIPTION OF THE DRAWINGS

The invention will be understood more clearly and other characteristics and advantages will appear from the following description, made with reference to the appended drawings, of which.

DESCRIPTION OF THE PREFERRED EMBODIMENT

Figure 1:
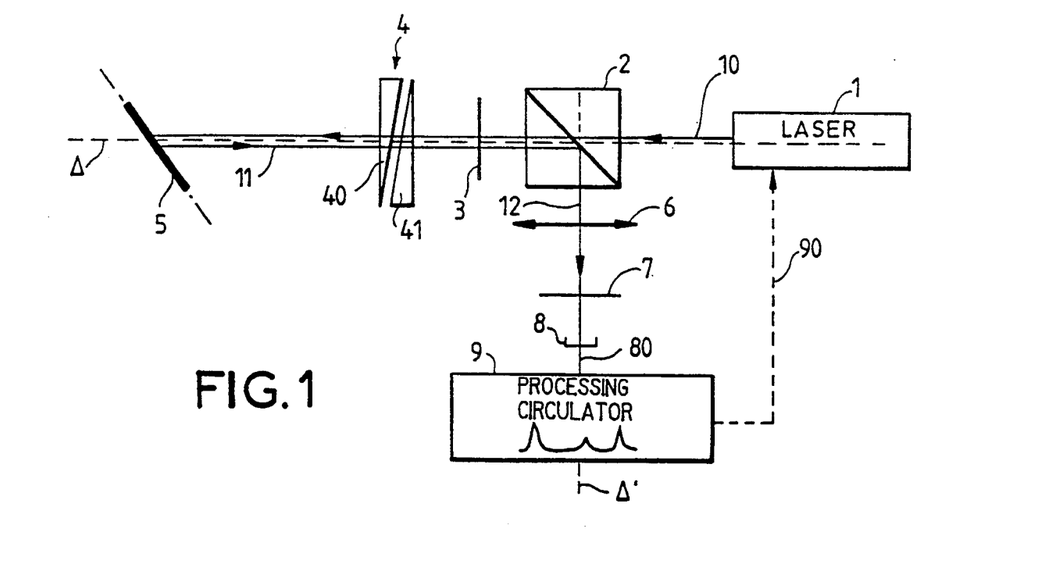
FIG. 1 provides a schematic illustration of a device according to the invention.

FIG. 1 gives a schematic illustration of a detection device according to the invention, according to a preferred embodiment.

Hereinafter, to clarify the subject without in any way thereby restricting the scope of the invention, the obstacle to be detected will be considered to be a cable of the type that conveys high-voltage electrical power and it will be assumed that the device is intended for a helicopter.

As indicated, the source 1 used is a pulsed laser diode. The pulsed power is typically of the order of 100 W. The wavelength of emission is equal to 0.9 μm, i.e. it is in the infrared range. The light pulse 10 sent along an axis of sight Δ goes through a contra-rotating wedge 4, the role of which shall be described with greater precision here below.

If the ray 10 thus sent is intercepted by a cable 5 (and generally by an obstacle), it is reflected or back-scattered (ray 11), entirely or partly in echo form towards the detection device.

In the preferred alternative embodiment shown in FIG. 1, in order to have only one scanning device, the system used is a common sending/receiving optical system with separation as regards the polarization of light. The separation is obtained, for example, by the use of a polarization separator cube 2 and a quarter wave plate 3. The contra-rotating wedge 4 is therefore used when sending and when receiving. At transmission, the ray 10 sent out by the source 1 is polarized linearly (for example vertically) and transmitted by the polarization separator cube 2. It goes through the quarter wave plate 3 which converts it into a circular (for example right circular) polarization. After reflection or back-scattering, the ray 11 that is picked up has a reverse polarization (a left circular polarization in the example). At reception, the ray 11 that is picked up crosses the quarter wave plate 3, making the polarization linear (horizontal in the example). It is reflected by the polarization separator cube 2 along an axis Δ' orthogonal to the axis Δ. The ray 12 thus reflected is focused by a lens 6, goes through an interference filter 7 designed to transmit only one wavelength band centered on the wavelength at which the laser source 1 emits. It is then detected by an avalanche photodiode 8 or by any other appropriate means of detection. The photodiode 8 converts the light energy into an electrical signal 80 capable of being exploited by signal processing means 9. These means include means for the analog-digital conversion of the electrical signal 80 delivered by the photodiode 8.

These processing means comprise control circuits (not shown) generating a laser emission control signal 90.

The scanning of the line of sight that takes the form of the axis Δ is obtained by means of the contra-rotating wedge 4, constituted by two prisms 40 and 41 in contra-rotation with respect to each other with a speed-reduction ratio that is typically equal to ten. The two prisms 40 and 41 therefore describe uniform rotational motions, thus eliminating the need to resort to a synchronizing or harmonizing operation. The refresh rate of the image is determined by the rotation speed of the slowest prism. It is therefore possible to achieve image rates of the order of some hertz.

Figure 2A:
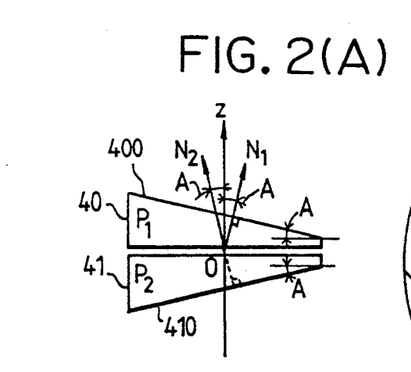
FIGS. 2 and 3 illustrate the working of a contra-rotating wedge.
Figure 2B:
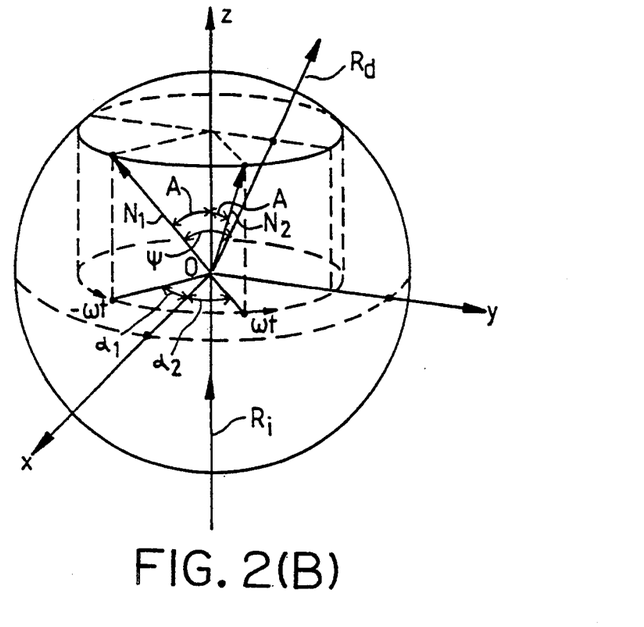

FIG. 2 illustrates the working of a contra-rotating wedge. An optical element of this type is described, by way of an example, in the book by G. Broussard, *Optoelectronique* (Optoelectronics), Masson et Cie, 1974, pp. 174–175. The characteristics of a contra-rotating wedge shall be recalled briefly. This optical element comes under the category of mechanical optical deflectors. It uses two identical prisms $P_1$ and $P_2$, positioned back to back and capable of rotating about one and the same axis Z (axis Δ in FIG. 1).

The prisms $P_1$ and $P_2$ corresponds to the prisms 40 and 41 of FIG. 1. The contra-rotating wedge is referenced with respect to an orthonormal trihedron having axes OZ, OX and OY.

The following conventions are adopted:

$\bar{N}_1$ and $\bar{N}_2$ are the normals (unit vectors) to the external faces 400 and 410 of the prisms $P_1$ and $P_2$, OZ is the rotation axis (axis Δ in FIG. 1)

$\alpha_1$ and $\alpha_2$ are the angular positions of the prisms with reference to the axis OX, A is the common angle at the apex.

The coordinates of the vectors $N_1$ and $N_2$ with respect to the axes of the reference trihedron are governed by the following relationships.

$$\vec{N}_1 \begin{vmatrix} \sin A \cos \alpha_1 \\ \sin A \sin \alpha_1 \\ \cos A \end{vmatrix} \quad (1)$$

$$\vec{N_2} \begin{vmatrix} \sin A \cos\alpha_2 \\ \sin A \sin\alpha_2 \\ \cos A \end{vmatrix} \qquad (2)$$

The angle $\Psi$ between $\vec{N_1}$ and $\vec{N_2}$ is also the angle at the apex of the equivalent prism. It is given by the relationship:

$$\cos \Psi = \sin^2 A \cos(\alpha_2 - \alpha_1) + \cos^2 A$$

Several modes of operation are possible. The most promising mode in the context of the preferred embodiment of the device according to the invention is the one where the prisms are moved by angular speeds, one of which is a whole multiple of the other, and where they are moved in opposite directions (contra-rotation).

If $\omega$ designates the pulsation, we have for example:

$$\alpha_1 = -\omega t \qquad (4)$$

$$\alpha_2 = p\omega t \qquad (5)$$

From the above, it is possible to deduce the deviation $\delta$ of the deflected ray $R_d$ with respect to the direction of the incident ray $R_i$ assumed to be parallel to the axis OZ (axis $\Delta$ of emission of the laser source 1). The deviation is given by the relationship:

$$\delta = 2A(n-1)\sin\left(\frac{P+1}{2}\omega t\right). \qquad (6)$$

The plane of the deflected ray is defined by the incident ray $R_i$ and the normal to the edge of the prism which is none other than the external bisector of the angle formed by the vectors $\vec{N_1}$ and $\vec{N_2}$. This bisector is located in the plane XOY and it forms an angle $\theta$ with OX, this angle $\theta$ being given by the relationship:

$$\theta = \frac{\alpha_1 + \alpha_2}{2} + \frac{\pi}{2} = \frac{P-1}{2}\omega t + \frac{\pi}{2} \qquad (7)$$

In the plane XOY, perpendicular to the axis Z (i.e. to the axis $\Delta$), the relationships (6) and (7) define an epicycloidal scanning.

Figure 3:
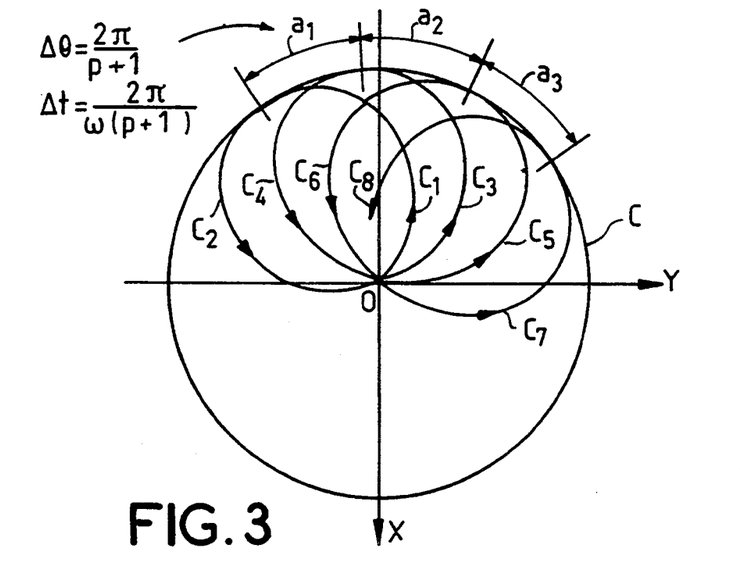

FIG. 3 illustrate the shape of the curve formed by the scanning.

The curve is inscribed in a circle C. It is tangential to this circle C at equidistant points: the circle arcs $a_1$, $a_2$, $a_3$, etc. . . . correspond to angles:

$$\Delta\theta = \frac{2\pi}{p+1} \qquad (8)$$

and correspond also to passage times separated by equal time intervals $\Delta$:

$$\Delta t = \frac{2\pi}{\omega(p+1)} \qquad (9)$$

All the segments of the scanning curve, eight of which have been shown by way of an illustration, $C_1$ to $C_8$, go through the axis OZ, i.e. the axis $\Delta$ of emission.

Figure 4:
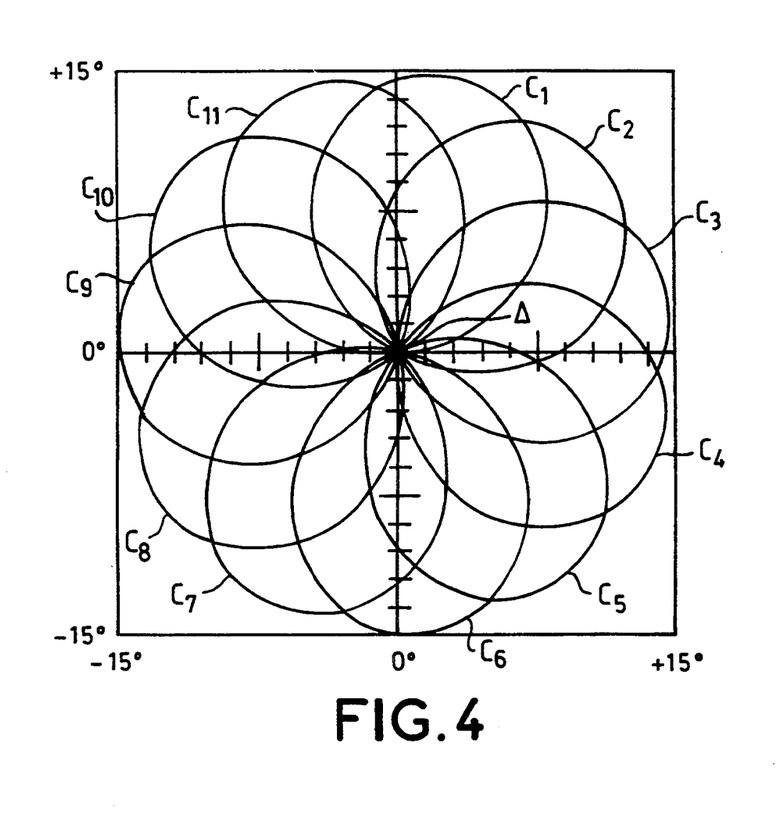
FIG. 4 is an example of a "scanning pattern" used within the framework of the invention.

FIG. 4 illustrates the scanning pattern obtained with two contra-rotating prisms with a speed-reduction ratio equal to ten, as indicated here above. The field of sight depends only on the angle at the apex of the prisms used in FIG. 3, the angle of sight is $\pm 15°$ with respect to the axis of sight constituted by the axis $\Delta$.

The scanning pattern obtained has the advantage of having points equidistant to within $\pm 10°$. It is therefore possible to make the two prisms rotate at a constant angular speed while at the same time ensuring that there are equidistant points. There is therefore no accumulation of points at the ends. A scanning with contra-rotating wedge is particularly suited to the large-sized pupils, the prisms performing uniform rotational motions.

Figure 5:
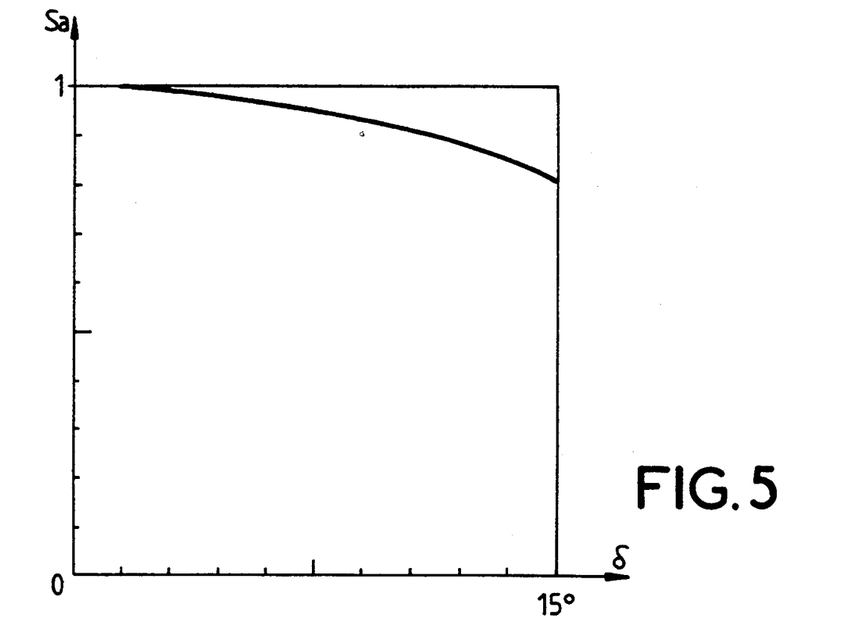
FIG. 5 illustrates the variation of angular separation, in arbitrary units, between two consecutive points as a function of the angle of deviation of the prism equivalent to contra-rotating wedge.

FIG. 5 illustrates the variation of the angular separation $S_a$ (on the y-axis) in arbitrary units between two consecutive points as a function of the angle of deviation $\delta$ (on the x-axis) of the prism equivalent to the contra-rotating wedge. The speed-reduction ratio of the speeds is, as above, chosen to be equal to 10. It is observed that the variation of the separation or angular speed remains below $\pm 10\%$.

The speed-reduction ratio may be naturally increased. In this case, the number of rosettes and hence the filling rate of the image is increased. In the example shown, the number of rosettes is equal to 11 (FIG. 4: $C_1$ to $C_{11}$).

Referring again to FIG. 1, it has been indicated that the optical signals, picked up by the device of the invention, are converted into electrical signals 80 by a photodiode 8 and transmitted to processing circuits 9.

The operation of these circuits shall now be explained.

Usually, the goals that can be set for a detection device such as the device of the invention are, firstly, to forecast the presence of an obstacle and, secondly, to characterize it.

The first goal can easily be understood since what is involved is a vehicle moving towards an obstacle that must be avoided.

To reach this goal, the measurement made by the detection device is a telemetrical measurement. Measurements are made, at every instant, firstly of the distance between the vehicle and the relief being flown over and, secondly, of obstacles if any.

Figure 6:
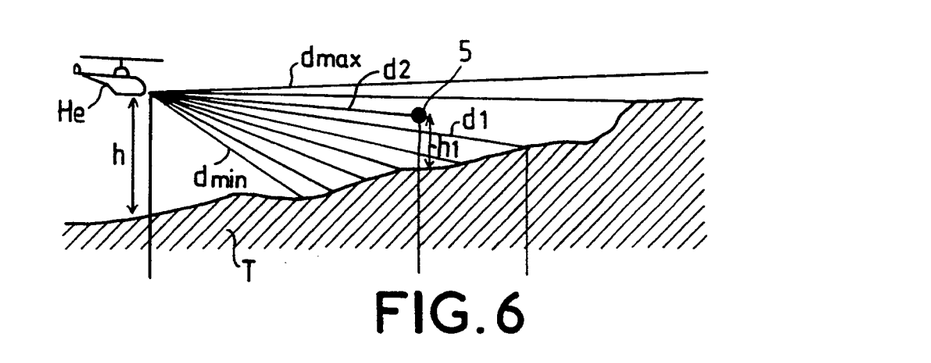
FIG. 6 illustrates the process of detection of an obstacle.

FIG. 6 illustrates this process.

The figure shows a helicopter $H_e$ overflying a relatively even relief T. Owing to the above-mentioned scanning effect, the distance measured varies constantly but, in principle, when there are no obstacles, it varies continuously. In FIG. 6, the distance measured when there are no obstacles varies between $d_{min}$ and $d_{max}$. The usual methods of telemetry may be implemented. It has been indicated that the laser source works in pulse mode. It is therefore enough to measure the time needed for a return journey, after reflection or back-scattering. Since the speed of light is known, the distance can be computed without difficulty.

However, owing to the presence of an obstacle, for example a cable 5, a sudden variation of the distance measured by telemetry is detected during the scanning.

However, the beam that is sent out is not infinitely thin but has a finite angle of divergence.

Figure 7:
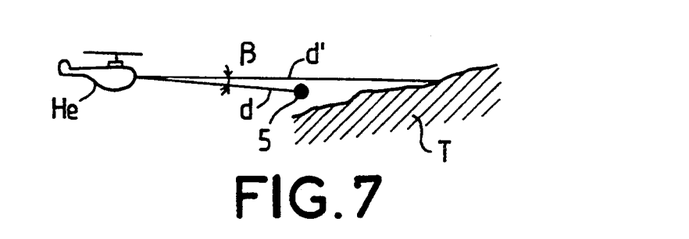
FIG. 7 illustrates a particular point of the method implemented in the invention, taking account of the real characteristics of a laser beam, notably its divergence.

This phenomenon is shown schematically in FIG. 7.

At any instant during the scanning process, the pencil of light energy that is sent has an angle of divergence $\beta$. A certain number of echos are obtained, corresponding to measured distances. When the pencil illuminates the cable 5, and if the angle of divergence $\beta$ is greater than the angle at which the cable 5 is viewed, then a certain number of echos corresponding to to the cable 5 are obtained at the distance d and a certain number of echos corresponding to the relief of the terrain T are obtained at the distance d'. To avoid the resultant uncertainties, the only echo preserved is the first received echo, namely the one corresponding to the measured distance d in the example illustrated.

Furthermore, to prevent false alarms, a threshold is applied. It is agreed that obstacles are present if the following relationship is verified:

$$|d_2 - d_1| > \text{Threshold} \tag{10}$$

The term "overhead" echo is also used. For, the successive measurements $d_{min}$ to $d_{max}$ correspond to distances between the helicopter $H_e$ and the ground. They can furthermore be reduced to relative altitudes, the altitude h of the helicopter being known by any appropriate means. Here below, it will be seen that the device according to the invention can also be used for this purpose.

However, the detection of a sudden variation in the telemetrical measurements corresponds *a priori* to the detection of an overhead obstacle.

This is the case with the cable 5 shown in FIG. 6. This cable 5 is not only closer to the helicopter than the relief T but also located at an altitude h, with respect to the local vertical.

For the application envisaged, in a preferred embodiment of the invention, an additional discrimination has to be made. Indeed, it is desired to show up certain obstacles that cannot be detected by conventional means such as cameras etc. These are, in particular, wire-shaped objects such as high-voltage cables etc. These objects are characterized notably by a small diameter.

A sudden variation in the telemetry may correspond to sudden variations of the relief, for example the presence of a tower, bridge or other building.

It therefore becomes necessary to apply an additional criterion relating to the dimension of the detected object, so that echoes characterizing major obstacles are not kept.

The detection proper of an obstacle by the processing circuit 9 (FIG. 1) can be done simply.

Figure 8:
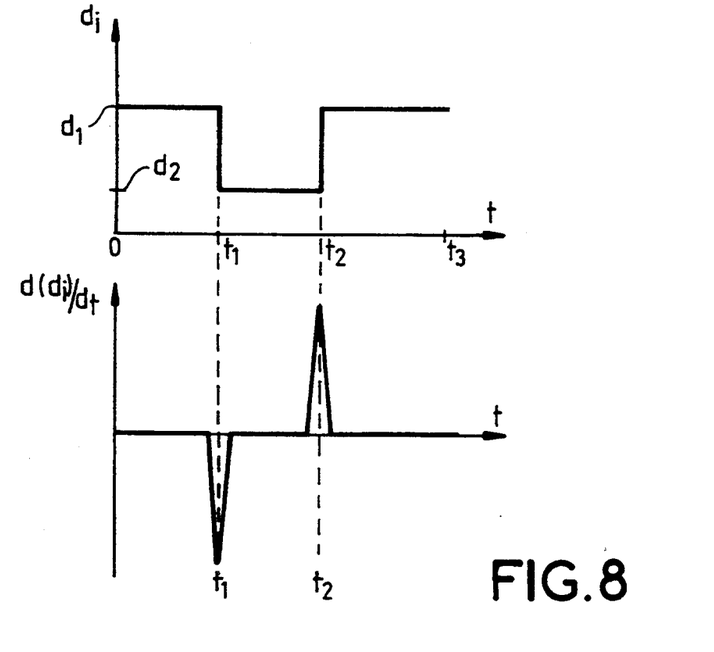
FIG. 8 is a timing diagram, illustrating the process of extraction of the echos corresponding to an obstacle.

FIG. 8 is a timing diagram illustrating the detection process. At each instant, the circuits 9 (FIG. 1) receive electrical signals converted by the photodiode 8 from the optical signals that have been picked up.

These circuits 9 include elements to control the emission by the laser source 1, represented schematically in FIG. 1 by a control link 90. In a standard way, the time that elapses between the sending and the reception is measured, and a computation is made of the telemetrical value, namely the distance $d_1$ between the device of the invention and the relief or the obstacle if any.

The upper part of FIG. 8 shows the variation in telemetrical value $d_i$ as a function of time t. The time interval O-$t_3$ shows only one portion of the scanning pattern illustrated in the diagram of FIG. 4. It is assumed that, during these time intervals, the telemetrical value corresponding to the relief T undergoes little variation: the distance measured is substantially equal to $d_1$.

On the contrary, between the instants $t_1$ and $t_2$, the distance measured decreases suddenly to the value $d_2$. The time interval $t_1-t_2$ is in a unique relationship with the thickness of the cable and, more generally, with the thickness of the obstacle. Indeed, the scanning speed is substantially constant, setting aside the precision of the contra-rotating wedge.

In a preferred variant, the differential value of the measured telemetrical operations is computed. The curve obtained is shown in the timing diagram of the bottom part of FIG. 8. This timing diagram represents the variation of the signal $[d(d_i)/dt]$. These signals may be used, for example, by a counter actuated by a clock signal. The amplitude of the counting between the instants $t_1$ and $t_2$ is then proportional to the thickness of the obstacle. It is directly usable by digital means. The value obtained can be compared with an instructed value, the maximum value of the diameter of a cable being known *a priori* or, in another variant, if the maximum value of the dimensions of the objects to be detected is decided upon.

Figure 9:
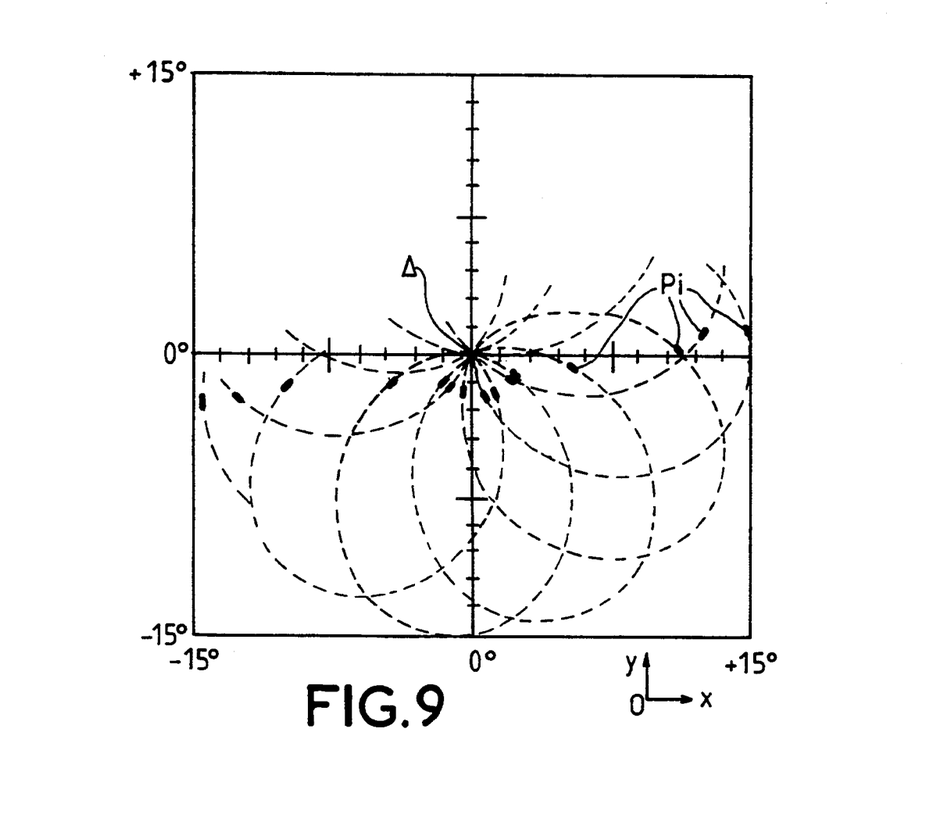
FIGS. 9 and 10 provide a more complete illustration of the detection of a wire-shaped object and of the process for extracting the main parameters that characterize it.

FIG. 9 shows a partial view of a "scanning pattern" obtained under the same conditions as the "scanning pattern" shown in FIG. 4, illustrating the process for the extraction of a wire-shaped object. The portions of curves have been shown in dashes and indicate the results of telemetry operations. In accordance with the above description, the only signals extracted are those meeting the criterion of overhead object and of thickness of the detected objects. The successive detections made during the scanning emerge in the form of curve segments, in heavy dashes P, in the pattern of FIG. 9.

The overhead echos thus detected may then be overlaid on a camera, for example of the CCD (charge-coupled device) type, or on any display means: night vision glasses, FLIR (forward light infrared receivers) or cathode screens.

For certain types of display means, the "scanning pattern" shown in FIG. 9 can be displayed directly or as an overlay.

For reasons of simplification, all that are extracted are the curve segments supposed to represent a detection of a cable or, more generally, a detection of a wire-shaped object. It is possible, however, in one exemplary embodiment that is not shown, to have recourse to a display in "false colors" that enables the association, with a color, of a measured distance or more specifically a range of distances. In this case, the curves will be displayed entirely and will show differently colored segments.

The segments $P_i$ (FIG. 9) will be associated with two parameters: their own lengths by which they can be identified as obstacles of the type being sought and one of the colors that indicate the distance between the different points of the detected object and the device of the invention.

In this case, the other segments will normally correspond to the distances between the different points of the relief of the device of the invention.

The display device of FIG. 9 has two graduated orthogonal axes, respectively parallel to the axes OX and OY of a 2D reference system, in which the axis OX represents the horizontal.

It is possible however that, from an ergonomic viewpoint, this display method is not considered to be satisfactory. In most cases, it will be necessary only to display the segments corresponding to the detections of the wire-shaped objects (segments $P_i$).

Figure 10:
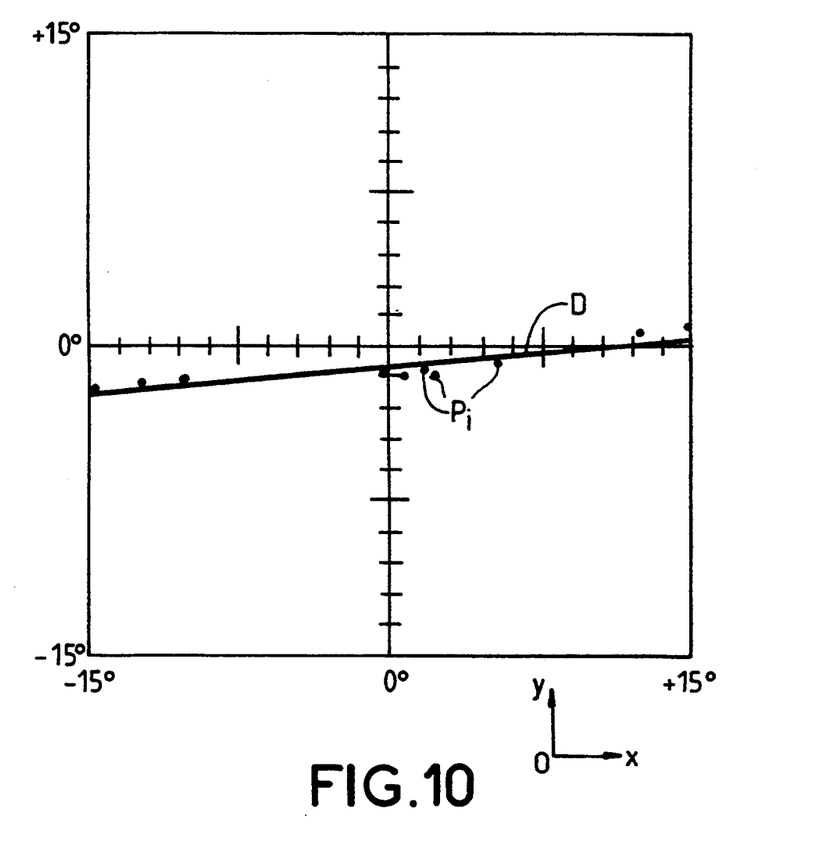

It is then possible to improve the method by implementing a known method of shape-recognition: for example, the least error squares method for example. Referring again to FIG. 9, it can easily be seen that, leaving aside the precision of the measurements, the segments $P_i$ are aligned. A method such as the ones mentioned above can be used to display a straight line D on the screen as illustrated in FIG. 10.

The exact nature of the curve D depends naturally on the real configuration of the obstacle. In other words, it is not necessarily a straight line. Furthermore, several obstacles may exist simultaneously, at identical or different distances. To illustrate the first case, we may cite a high-voltage line comprising several cables.

The number of points (or segments of curves) displayed naturally depends on the rate of "filling" of the scanning pattern. However, this rate cannot be increased indefinitely, for the scanning time also increases, and hence the "refresh" frequency of the image decreases accordingly for given relative rotational speeds of the prisms of the contra-rotating wedge. It therefore becomes necessary to accept compromises that depend on the application considered.

The straight line D, in the example illustrated, is therefore ultimately a closely approximate representation of the obstacle to be detected. This straight line, in turn, may be overlaid on an image coming from a standard camera which cannot detect obstacles of the wire-shaped type but gives a complete image of the ground overflown.

It is also possible to assign, to portions of the straight line D, colors that are a function of the distances measured and are associated with the different points $P_i$. This gives an idea of the relative distances between the device of the invention and the different points of the object detected.

It is also possible to overlay digital values on the screen, at the locations of the points $P_i$, and to achieve an monochromatic display.

These are only variants of embodiments among those possible in the field of display.

The device of the invention, certain embodiments of which have just been described, may be used to perform an operation of altimetry in relation to the ground. In this case, the device must be integrated into a gyrostabilized platform in order to get rid of the effects of the motions of the carrier. It can also be used as a warning system against obstacles on the path (similar to the device known as the GPWS or Ground Proximity Warning System) or more generally to carry out a terrain tracking operation.

The above-described device or a simplified version thereof may also be used for large-scale consumer applications, especially in the field of automobiles. It can then replace LIDAR-based devices: only the method implemented for the detection of the obstacles will differ.

The obstacle detection method must, first of all, take account of the different situations encountered on curved paths or on straight paths. In particular, the alarm should not be raised when an obstacle is detected but is not in the path of the vehicle.

The obstacle detection method must, for example, take account of the vector of speed of the moving body in its environment and the turn of the wheels. These information elements are sent to the circuits 9 (FIG. 1) by known means such as sensors, computers etc.

The information on "obstacle ahead" will be expressed in most cases by a simple signal: light indicator on the dashboard, sound signal, display of a message or a combination of these actions.

In a more elaborate version, the image of the obstacle, in color that is coded according to the distance or the time before impact and is determined by an onboard computer, may be projected on the windscreen by means of the head-up display techniques used in aeronautics.

The device of the invention is naturally not limited to the various embodiments specifically described herein.

It is possible, for example, without going beyond the scope of the invention, to use gallium-arsenic / gallium-aluminium-arsenic type diodes of the Nd:Yag or micro Nd:Yag types, or diodes emitting on the 1.5 $\mu$m wavelength. These diodes should preferably be used in pulsed mode, for it is this mode that enables the simplest telemetrical operation to be implemented. It is enough to measure the time taken by the emitted pulse to make the return journey, as indicated here above. However, there exist other more complex methods.

It has also been indicated that the contra-rotating wedge is used for sending and for receiving. This arrangement enables a structure that is both compact and simple. It is possible, however, to use two contra-rotating wedges, but in this alternative embodiment, the two contra-rotating wedges should be phased, and this requirement makes the approach more complicated.

What is claimed is:

1. A telemetry device comprising:
sending means for sending a pencil of light energy along an axis of sight for measurement of distances between the sending means and a target, located in an environment, which reflects back, as an echo, at least a part of the received energy back towards the sending means; and
means for reception of the reflected energy
wherein said device further comprises at least one contra-rotating wedge provided with two prisms that are moved by rotational speeds in opposite directions about said axis and that communicate a time-variable deflection to the pencil of light energy to generate a determined scanning pattern in a plane that is perpendicular to said axis, the pencil of light energy that is sent out scanning the target according to the configuration of the scanning pattern,
said device further including:
means for determining a shape and distance of said target using said received reflected energy;
camera means for determining an image of the environment, said camera means being unable to clearly detect said target; and
display means for displaying an overlay of said determined shape of said target onto said image of the environment.

2. A device according to claim 1, wherein the first of said prisms is moved by a first rotational speed and the second prism is moved by a second rotational speed that is a whole multiple of the first speed, and wherein said scanning figure is epcycloidal.

3. A device according to claim 1, wherein the contra-rotating wedge is common to said sending and receiving means, and wherein the device comprises means for separating the energy sent out and the energy received.

4. A device according to claim 3, wherein the reception means includes a photodiode converting the light energy into an electrical signal; and wherein the separation means includes a quarter-wave plate and a polarization separator cube positioned between, firstly, the sending means and the contra-rotating wedge and, secondly, between the contra-rotating wedge and the reception means.

5. A device according to claim 1, wherein the sending means comprise a laser source controlled in pulses.

6. A device according to claim 5, wherein the laser source emits a spectrum of wavelengths centered on the 0.9 μm wavelength.

7. A device according to claim 3, wherein the distance determining means, for the determining of the distances, select the first echo received corresponding to the sending of each of said pulses.

8. A system for the detection of at least one obstacle, comprising a telemetry device according to any of the claims 1 to 7 and further comprising means for the extraction of the echos corresponding to obstacles of a determined type.

9. A system according to claim 8, wherein said extraction means detects sudden variations of distance greater than a determined threshold during said scanning.

10. A system according to claim 9 wherein, the target to be detected being of the wire-shaped type, said extraction means further determines at least the dimensions of the target along at least one measurement axis and extracts the echos corresponding to said dimensions below a determined threshold.

11. A system according to claim 10 wherein, the wire-shaped objects are circular-sectioned cables, and said determined dimensions are the diameters.

12. A system according to claim 10, wherein said dimensions are in a unique relationship with segments of said scanning pattern in a determined plane perpendicular to the axis of sight.

13. A device according to claim 1, wherein said display means displays said overlay of said determined shape using colors which indicate a distance of said target to said reception means.

* * * * *